(12) United States Patent  
Miura

(10) Patent No.: US 10,941,853 B2  
(45) Date of Patent: Mar. 9, 2021

(54) SHIFT DEVICE

(71) Applicant: KABUSHIKI KAISHA TOKAI-RIKA-DENKI-SEISAKUSHO, Aichi (JP)

(72) Inventor: Takahiro Miura, Aichi (JP)

(73) Assignee: KABUSHIKI KAISHA TOKAI-RIKA-DENKI-SEISAKUSHO, Aichi (JP)

(*) Notice: Subject to any disclaimer, the term of this patent is extended or adjusted under 35 U.S.C. 154(b) by 105 days.

(21) Appl. No.: 16/345,485

(22) PCT Filed: Oct. 18, 2017

(86) PCT No.: PCT/JP2017/037691  
§ 371 (c)(1),  
(2) Date: Apr. 26, 2019

(87) PCT Pub. No.: WO2018/088151  
PCT Pub. Date: May 17, 2018

(65) Prior Publication Data  
US 2019/0249767 A1  Aug. 15, 2019

(30) Foreign Application Priority Data  
Nov. 10, 2016 (JP) .............................. JP2016-219712

(51) Int. Cl.  
*F16H 59/02* (2006.01)  
*G05G 1/10* (2006.01)  
(Continued)

(52) U.S. Cl.  
CPC .......... *F16H 59/0278* (2013.01); *B60K 20/02* (2013.01); *G05G 1/06* (2013.01); *F16H 59/105* (2013.01)

(58) Field of Classification Search  
CPC ... F16H 59/0278; F16H 59/105; B60K 20/02; G05G 1/04; G05G 1/10; G05G 1/12; G05G 1/06  
See application file for complete search history.

(56) References Cited

U.S. PATENT DOCUMENTS 6,732,608 B2 * 5/2004 Suzuki .................... F16H 59/02  
74/473.3  
2020/0300356 A1 * 9/2020 Nonogawa .......... F16H 59/0278

FOREIGN PATENT DOCUMENTS

FR     3049016 A1 * 9/2017 ................ F16B 2/08  
JP     S62-151624 U   9/1987  
(Continued)

OTHER PUBLICATIONS

International Search Report and Written Opinion issued in corresponding International Application No. PCT/JP2017/037691 dated Jan. 9, 2018.

*Primary Examiner* — Adam D Rogers  
(74) *Attorney, Agent, or Firm* — Roberts Calderon Safran & Cole P.C.

(57) ABSTRACT

When a knob of a shift lever device is being assembled, a pair of design frames are assembled to a knob main body, and then a cover is assembled to the knob main body. When the cover is being assembled to the knob main body, ribs of the pair of design frames are inserted into an insertion hole in the cover. The pair of ribs are put into surface contact with one another in a left-and-right direction, and distal end portions of the pair of design frames are put into surface contact in the left-and-right direction. Consequently, the formation of a gap between the distal end portions of the pair of design frames may be inhibited.

13 Claims, 5 Drawing Sheets

(51) Int. Cl.
*B60K 20/02* (2006.01)
*G05G 1/06* (2006.01)
*F16H 59/10* (2006.01)

(56) References Cited

FOREIGN PATENT DOCUMENTS

| JP | 07293679 A | * | 11/1995 | |
|----|------------|---|---------|-----------|
| JP | 2002002321 A | * | 1/2002 | ............. F16H 59/02 |
| JP | 4681222 B2 | * | 5/2011 | |
| JP | 2014100945 A | * | 6/2014 | ......... F16H 59/0278 |

* cited by examiner

SHIFT DEVICE

CROSS-REFERENCE TO RELATED APPLICATIONS

The present application is a U.S. National Phase of PCT/JP2017/037691 filed on Oct. 18, 2017, claiming priority under 35 USC 119 from Japanese Patent Application No. 2016-219712 filed Nov. 10, 2016. The disclosure of which is incorporated by reference herein.

TECHNICAL FIELD

The present invention relates to a shift device in which a shift body is moved and a shift position is changed.

BACKGROUND ART

In a knob structure recited in Japanese Utility Model Application Laid-Open (JP-U) No. S62-151624, an inner knob, an upper cover and a lower cover are provided at a knob. The upper cover and lower cover cover the inner knob. Engaging grooves are provided in the inner knob, and engaging protrusions are provided at a lower end portion of the upper cover and an upper end portion of the lower cover. The engaging protrusions are inserted into the engaging grooves.

However, in this knob structure, the lower end portion of the upper cover and the upper end portion of the lower cover are not in contact, and a gap is formed between the lower end portion of the upper cover and the upper end portion of the lower cover.

Furthermore, if the engaging protrusions are not properly inserted into the engaging grooves, an outer periphery of the lower end portion of the upper cover and an outer periphery of the upper end portion of the lower cover are separated, and a step is formed between the lower end portion of the upper cover and the upper end portion of the lower cover.

SUMMARY OF INVENTION

Technical Problem

In consideration of the circumstances described above, an object of the present invention is to provide a shift device that may inhibit the formation of a gap between a pair of adjacent portions and a shift device that may inhibit the formation of a step between a pair of adjacent portions.

Solution to Problem

A shift device according to a first aspect of the present invention includes: a pair of adjacent bodies provided at a shift body that is moved to change a shift position, an adjacent portion and an operation portion being provided at each adjacent body, and the adjacent portions being adjacent to one another; and an assembly body provided at the shift body, the assembly body being provided with an assembly portion into which the operation portions are inserted, by which the adjacent portions are put into contact.

A shift device according to a second aspect of the present invention includes: a pair of adjacent bodies provided at a shift body that is moved to change a shift position, an adjacent portion and an operation portion being provided at each adjacent body, and the adjacent portions being adjacent to one another; and an assembly body provided at the shift body, an assembly portion being provided at the assembly body, the assembly portion being capable of pressing at least one of the operation portions from a shift body outer side thereof, and the assembly portion being capable of putting outer peripheries of the adjacent portions into close proximity.

In a shift device according to a third aspect of the present invention, in the shift device of the second aspect of the present invention, the pressing portion is capable of pressing the operation portion from a side of the operation portion in a direction orthogonal to a direction of protrusion of the operation portion.

In a shift device according to a fourth aspect of the present invention, the shift device of any one of the first to third aspects of the present invention further includes a pressing body that is provided at the shift body, that is assembled to the assembly body, that is capable of pressing at least one of the operation portions from a shift body inner side thereof, and that is capable of putting outer peripheries of the adjacent portions into close proximity.

In a shift device according to a fifth aspect of the present invention, the shift device of any one of the first to fourth aspects of the present invention further includes a guide portion that is provided at the assembly body and that guides the operation portion to the assembly portion.

In a shift device according to a sixth aspect of the present invention, in the shift device of any one of the first to fifth aspects of the present invention, the adjacent portion and the operation portion are provided at a length direction end portion of the adjacent body.

Advantageous Effects of Invention

In the shift device according to the first aspect of the present invention, the shift body is moved to change the shift position. The pair of adjacent bodies and the assembly body are provided at the shift body, the respective adjacent portions are provided at the pair of adjacent bodies, and the adjacent portions are adjacent to one another.

The respective operation portions are provided at the pair of adjacent bodies, and the assembly portion is provided at the assembly body. The operation portions are inserted into the assembly portion, by which the adjacent portions are put into contact. Therefore, the formation of a gap between the adjacent portions may be inhibited.

In the shift device according to the second aspect of the present invention, the shift body is moved to change the shift position. The pair of adjacent bodies and the assembly body are provided at the shift body, the respective adjacent portions are provided at the pair of adjacent bodies, and the adjacent portions are adjacent to one another.

In this structure, the respective operation portions are provided at the pair of adjacent bodies, and the assembly portion is provided at the assembly bodies. The assembly portion is capable of pressing at least one of the operation portions from the shift body outer side thereof, and is capable of putting the outer peripheries of the adjacent portions into close proximity. Therefore, the formation of a step between the adjacent portions may be inhibited.

In the shift device according to the third aspect of the present invention, the pressing portion is capable of pressing the operation portion from the side of the operation portion in the direction orthogonal to the direction of protrusion of the operation portion. Therefore, the outer peripheries of the adjacent portions may be put into close proximity effectively, and the formation of a step between the adjacent portions may be inhibited effectively.

In the shift device according to the fourth aspect of the present invention, the pressing body is provided at the shift body, and the pressing body is assembled with the assembly body.

In this structure, the pressing body is capable of pressing at least one of the operation portions from the shift body inner side thereof, and is capable of putting the outer peripheries of the adjacent portions into close proximity. Therefore, the formation of a step between the adjacent portions may be inhibited.

In the shift device according to the fifth aspect of the present invention, the guide portion of the assembly body guides the operation portion to the assembly portion. Therefore, the operation portion may be moved to the assembly portion easily.

In the shift device according to the sixth aspect of the present invention, the adjacent portion and the operation portion are provided at the length direction end portion of the adjacent body. Therefore, a position of the adjacent portion and a position of the operation portion may be close to one another, and the adjacent portions may be put into close proximity effectively.

DETAILED DESCRIPTION

Figure 1:
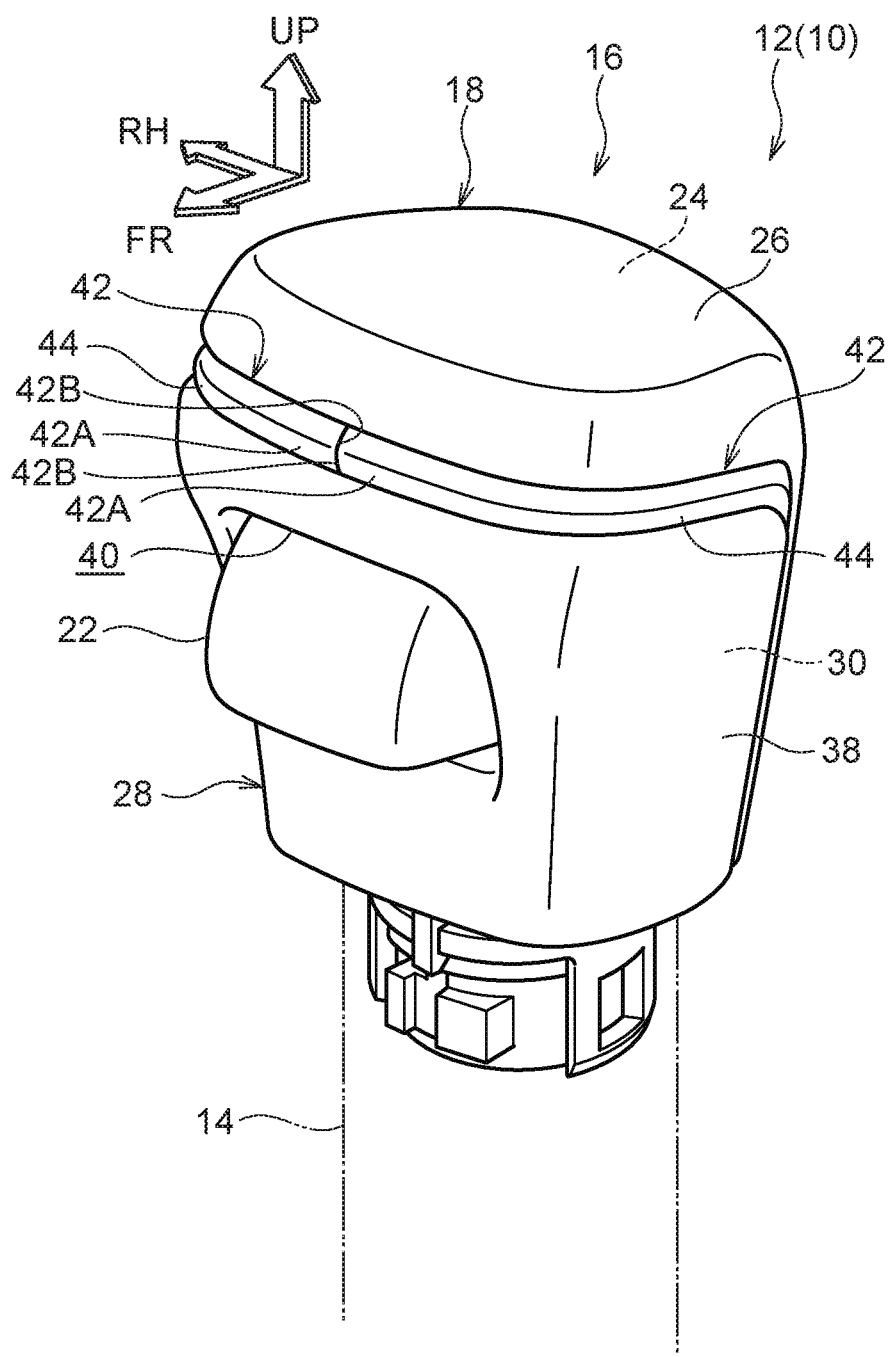
FIG. 1 is a perspective view, seen diagonally from the front-left, showing a knob of a shift lever device according to an exemplary embodiment of the present invention.
Figure 2:
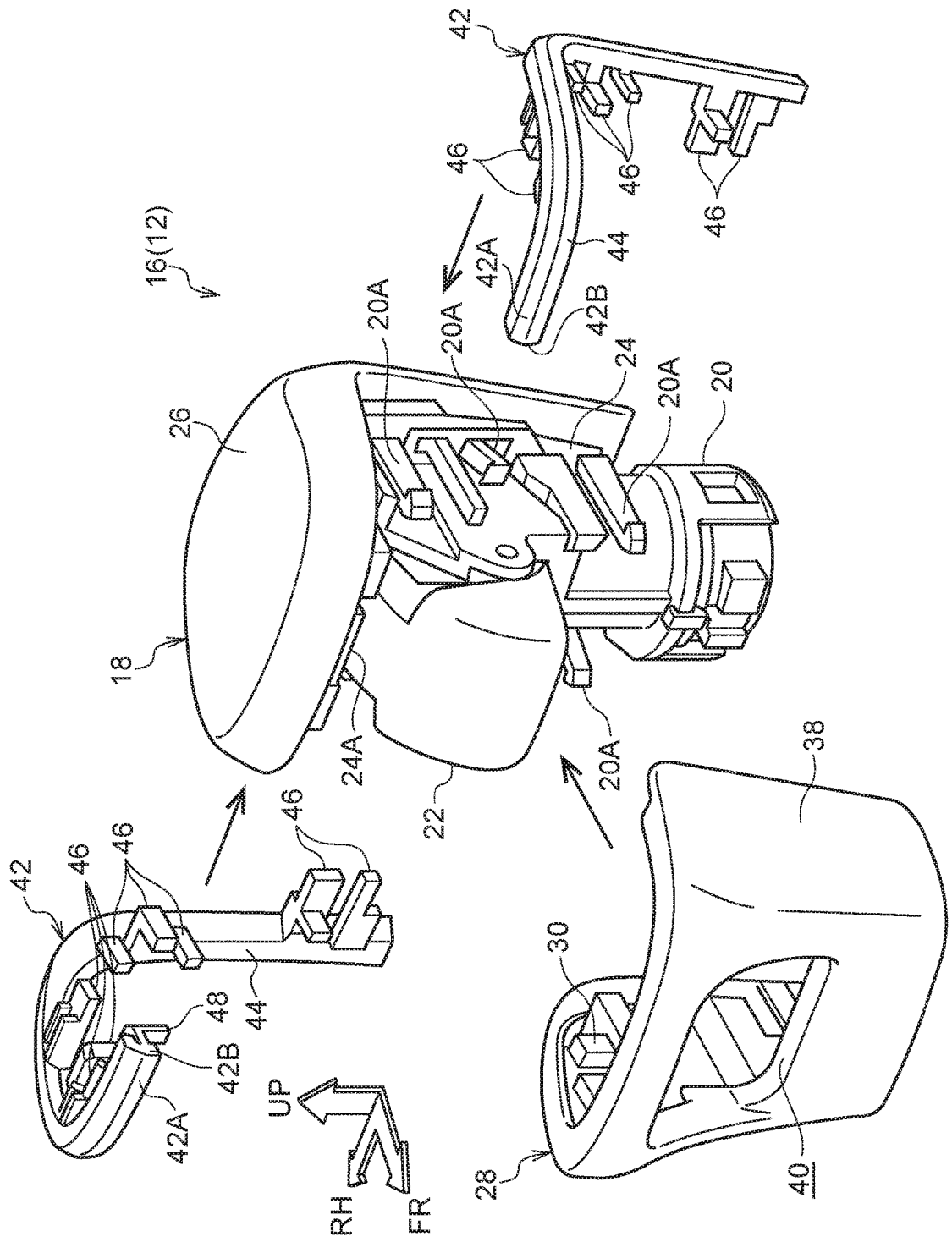
FIG. 2 is an exploded perspective view, seen diagonally from the front-left, showing the knob of the shift lever device according to the exemplary embodiment of the present invention.

FIG. 1 is a perspective view, seen diagonally from the front-left, showing principal portions of a shift lever device 10 that serves as a shift device according to an exemplary embodiment of the present invention. FIG. 2 is an exploded perspective view, seen diagonally from the front-left, showing the principal portions of the shift lever device 10. In the drawings, a front direction of the shift lever device 10 is indicated by arrow FR, a left direction of the shift lever device 10 is indicated by arrow LH, and an upper direction of the shift lever device 10 is indicated by arrow UP.

As illustrated in FIG. 1 and FIG. 2, the shift lever device 10 according to the present exemplary embodiment is equipped with a substantially rod-shaped shift lever 12 that serves as a shift body. A substantially circular tube-shaped lever 14 that serves as a shift main body is provided at the shift lever 12. The lever 14 is disposed to be parallel with the vertical direction. A lower side region (proximal end side region) of the lever 14 is supported by a support body (not shown in the drawings) at a vehicle body side, to be rotationally movable in the front-and-rear direction. A shift position of the shift lever 12 is changed by the shift lever 12 being rotationally moved (shifted) in the front-and-rear direction and the lever 14 being rotationally moved in the front-and-rear direction.

A knob 16 that serves as a grip body is assembled and fixed to an upper end portion (distal end portion) of the lever 14. The knob 16 may be gripped by an occupant of the vehicle. In the state in which the knob 16 is gripped, the shift lever 12 is rotationally moved in the front-and-rear direction by the knob 16 being operated to rotationally move in the front-and-rear direction.

Figure 3:
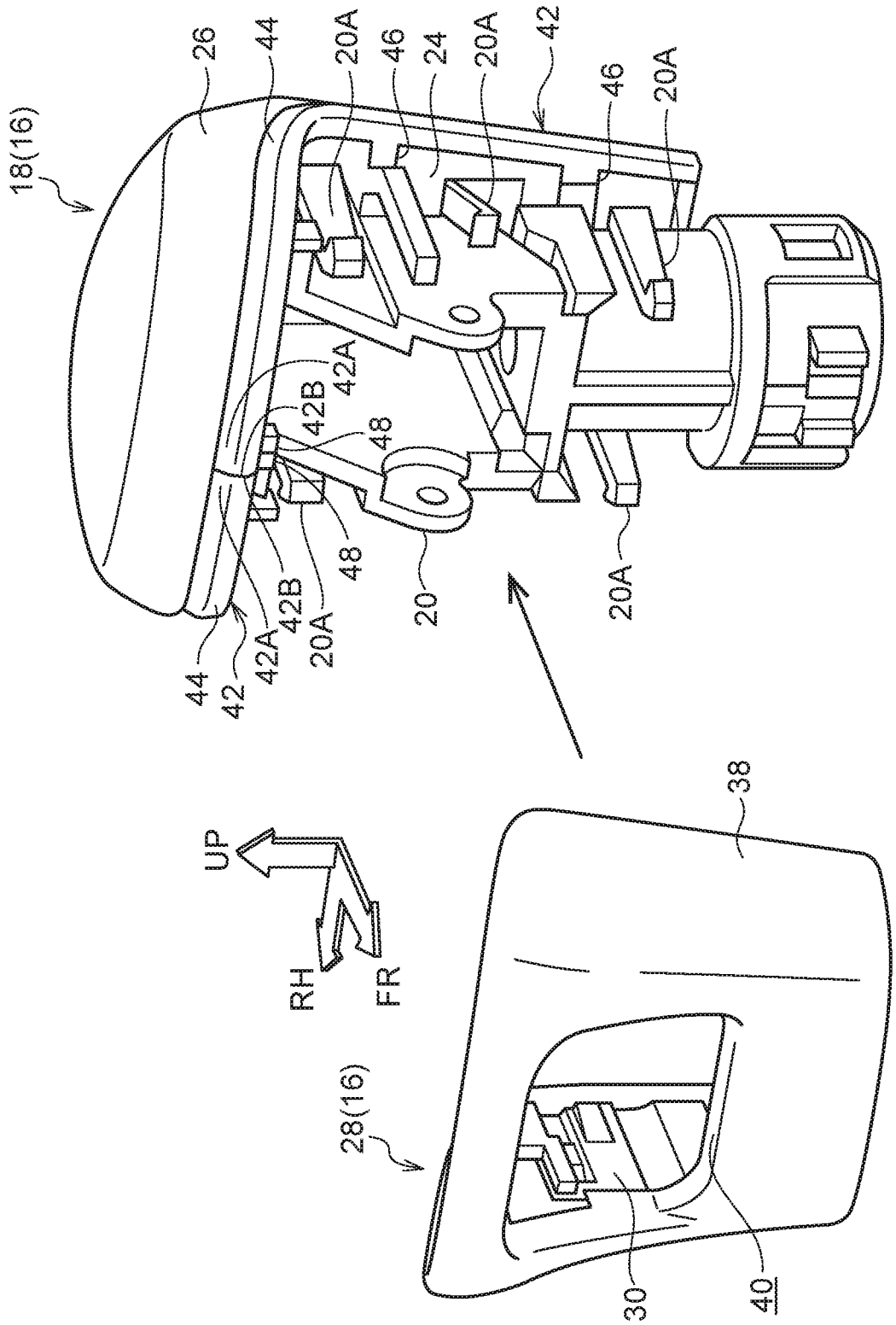
FIG. 3 is an exploded perspective view, seen diagonally from the front-left, showing principal portions of the knob of the shift lever device according to the exemplary embodiment of the present invention.

A knob main body 18 that serves as a pressing body (see FIG. 3) is provided at the knob 16.

A main body member 20 fabricated of resin is provided at the knob main body 18. A lower end region of the main body member 20 is formed substantially in a circular tube shape and is assembled to the upper end portion of the lever 14. An upper end region of the main body member 20 is formed substantially in a plate shape with a "U" shape in cross section. The interior of the upper side region of the main body member 20 is in fluid communication with the interior of the lower side region of the main body member 20. A button 22 substantially in a triangular wedge shape, which serves as an operation member, is supported to be rotationally movable at a front portion of the interior of the upper side region of the main body member 20. The button 22 is exposed at the front side of the knob 16, as described below, and may be rotationally movably operated by the vehicle occupant.

A plural number (three in the present exemplary embodiment) of an assembly pawl 20A are integrally provided at each of the left side and the right side of the main body member 20. Each assembly pawl 20A has a substantially long, narrow, rectangular plate shape and serves as a first assembly piece. The assembly pawls 20A are disposed at upper portions, vertical direction middle portions and lower portions of the main body member 20. The assembly pawls 20A protrude to the front side. Distal ends of the assembly pawls 20A protrude to thickness direction outer sides of the assembly pawls 20A.

An outer member 24 fabricated of resin substantially in a plate shape with an "L" shape in cross section is provided at the knob main body 18. The outer member 24 is integrated with the upper side region of the main body member 20. An upper side region of the outer member 24 is disposed at the upper side of the main body member 20, and the upper side region of the outer member 24 projects further to both sides in the front-and-rear direction and both sides in the left-and-right direction than the upper side region of the main body member 20. A lower side region of the outer member 24 is disposed at the rear side of the main body member 20. The lower side region of the outer member 24 projects further to both sides in the left-and-right direction and the lower side than the upper side region of the main body member 20.

A pressing wedge 24A substantially in a rectangular column shape, which serves as an inner pressing portion, is provided integrally at a central portion in the left-and-right direction in the vicinity of a front end of a lower face of the upper side region of the outer member 24. The pressing column 24A protrudes to the lower side. The pressing column 24A extends in the left-and-right direction, and a front face of the pressing column 24A is arranged orthogonally to the front-and-rear direction.

The upper side and rear side of the outer member 24 are covered by a first covering skin 26 that serves as a first covering material. Periphery portions of the first covering skin 26 cover the front end, left end and right end of the lower face of the upper side region of the outer member 24, and the lower end, left end and right end of a front face of the lower side region of the outer member 24. A resilient material (not shown in the drawings) is accommodated in a resiliently compressed state inside the first covering skin 26 (i.e., between the first covering skin 26 and the upper side and rear side of the outer member 24).

Figure 4A:
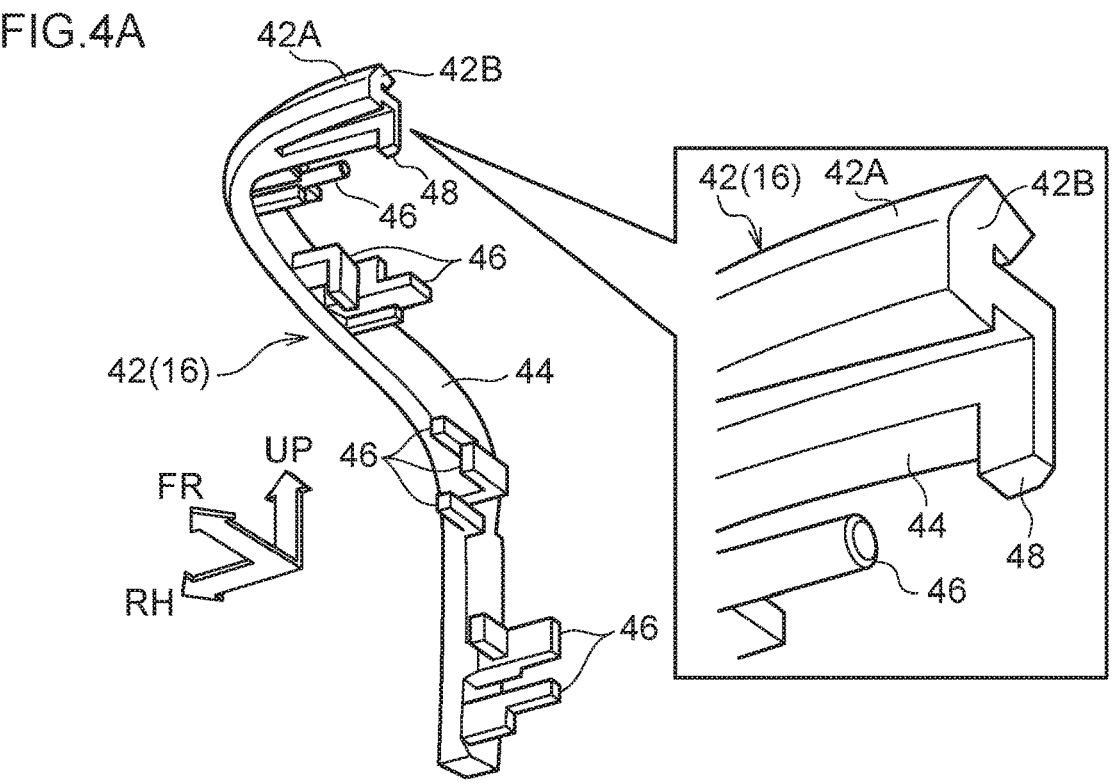
FIG. 4A is a perspective view, seen diagonally from the front-left, showing a design frame of the knob of the shift lever device according to the exemplary embodiment of the present invention.
Figure 4B:
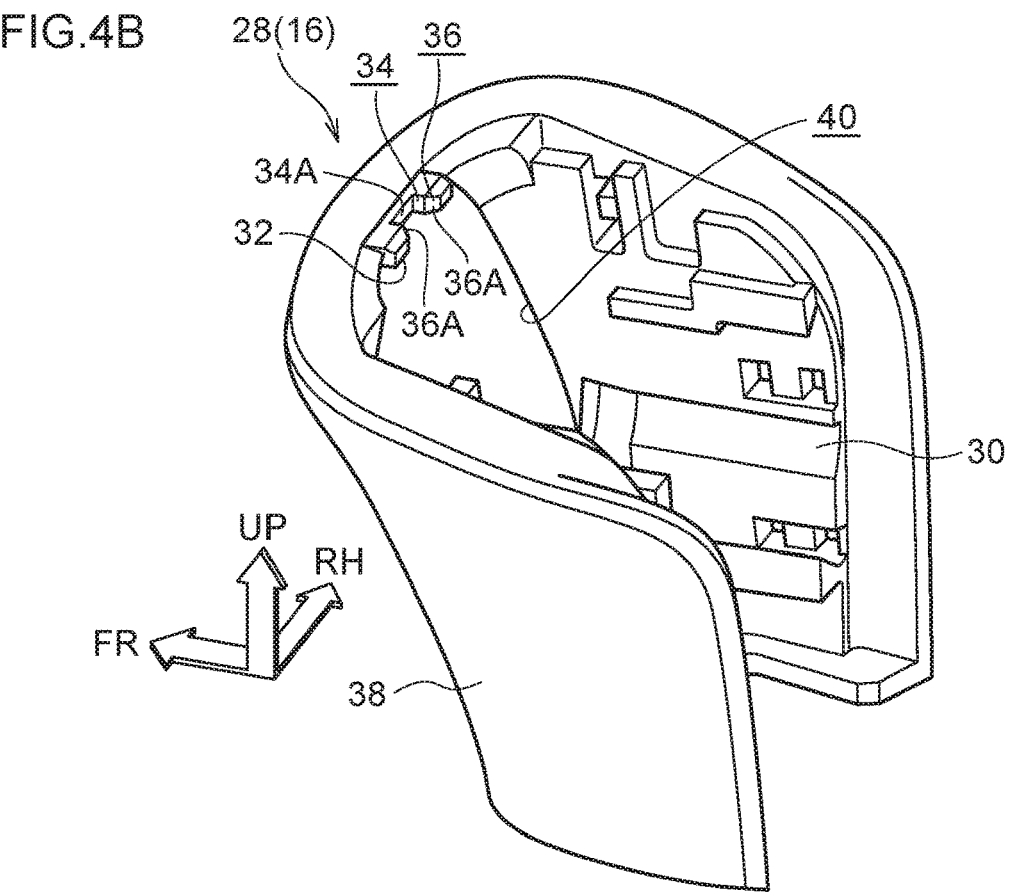
FIG. 4B is a perspective view, seen diagonally from the rear-left, showing a cover of the knob of the shift lever device according to the exemplary embodiment of the present invention.

A cover 28 (see FIG. 3 and FIG. 4B) that serves as an assembly body is provided at the knob 16.

An inner member 30 fabricated of resin substantially in a plate shape with a "U" shape in cross section is provided at the cover 28. The interior of the inner member 30 is open to both sides in the vertical direction and to the rear side. The distal ends of the assembly pawls 20A at the left side and right side of the main body member 20 of the knob main body 18 are resiliently engaged with, respectively, a left wall and right wall of the inner member 30 from the inner side of the inner member 30. Thus, the cover 28 is assembled to the knob main body 18, and the cover 28 covers the front side, left side and right side of the main body member 20. When the cover 28 is being assembled to the knob main body 18, the cover 28 is moved toward the rear side relative to the main body member 20, and the distal ends of the assembly pawls 20A resiliently engage with the inner member 30.

An assembly plate 32 substantially in a long, narrow, rectangular plate shape is integrally provided at a central portion in the left-and-right direction of the upper end of a rear face of the front wall of the inner member 30. The assembly plate 32 protrudes to the rear side and extends in the left-and-right direction. An insertion hole 34 in a long, narrow, rectangular shape that serves as an assembly portion (insertion portion) is formed penetrating through the assembly plate 32. The insertion hole 34 is elongated in the left-and-right direction. A left face and right face of the insertion hole 34 are arranged orthogonally to the left-and-right direction. A front surface of the insertion hole 34 is a pressing surface 34A that serves as an assembly portion (an outer pressing portion). The front surface of the insertion hole 34 is arranged orthogonally to the front-and-rear direction. An opening hole 36 in a trapezoid shape is formed penetrating into the assembly plate 32 at the rear side of the insertion hole 34. The opening hole 36 opens the insertion hole 34 up to the rear side. A left face and right face of the opening hole 36 are formed as planar angled surfaces 36A that serve as a guide portion. The angled surfaces 36A are angled to the outer sides of the opening hole 36 in the left-and-right direction towards the rear side.

The front side, left side and right side of the inner member 30 are covered by a second covering skin 38 that serves as a second covering material. Periphery portions of the second covering skin 38 cover end faces at the upper side, lower side and rear side of the inner member 30. The periphery portions of the second covering skin 38 oppose the periphery portions of the first covering skin 26 of the knob main body 18, and a gap is formed between the periphery portions of the second covering skin 38 and the periphery portions of the first covering skin 26. A resilient material (not shown in the drawings) is accommodated in a resiliently compressed state inside the second covering skin 38 (i.e., between the second covering skin 38 and the front side, left side and right side of the inner member 30).

An exposure hole 40 in a rectangular shape is formed penetrating through the front wall of the cover 28. Periphery faces of the exposure hole 40 are covered by the second covering skin 38. The button 22 of the knob main body 18 is inserted into the exposure hole 40. Thus, the exposure hole 40 exposes the button 22 at the front side of the knob 16.

Design frames 42 in long, thin rod shapes that serve as adjacent bodies (see FIG. 3 and FIG. 4A) are provided at a left side region and a right side region of the knob 16. The pair of design frames 42 are formed in shapes that are symmetrical with one another about a plane orthogonal to the left-and-right direction. An interior portion of each design frame 42 is fabricated of resin, and a metal plating 44 is formed over the whole periphery of the design frame 42.

The design frames 42 are disposed between the periphery portions of the first covering skin 26 of the knob main body 18 and the periphery portions of the second covering skin 38 of the cover 28. The design frames 42 are sandwiched in width directions thereof between the periphery portions of the first covering skin 26 and the periphery portions of the second covering skin 38. A proximal end side region of each design frame 42 extends substantially in the vertical direction, and a middle region of the design frame 42 extends to the front side from the upper end of the proximal end side region of the design frame 42. A distal end side region of the design frame 42 extends in the left-and-right direction to a middle side of the knob 16 from the front end of the middle region of the design frame 42. Distal end portions 42A of the pair of design frames 42 serve as adjacent portions and are adjacent to one another in the left-and-right direction. Front faces of the design frames 42 protrude in "V" shapes in cross section. The front faces of the design frames 42 are exposed at the outside of the knob 16 and constitute a design surface of the knob 16.

Plural assembly protrusions 46 are integrally provided at a back face of the proximal end side region and middle region of each design frame 42 (the face thereof at the inner side of the knob 16 in the left-and-right direction). The assembly protrusions 46 protrude towards the inner side of the knob 16 in the left-and-right direction. The assembly protrusions 46 are engaged (inserted or the like) with the main body member 20 of the knob main body 18 from the outer sides of the knob 16 in the left-and-right direction. Thus, the design frames 42 are assembled to the knob main body 18. When the design frames 42 are being assembled to the knob main body 18, before the cover 28 is assembled to the knob main body 18, each design frame 42 is moved toward the inner side of the knob 16 in the left-and-right direction relative to the main body member 20, and the assembly protrusions 46 are engaged with the main body member 20.

A rib 48 substantially in a rectangular column shape, which serves as an operation portion, is integrally provided at the distal end portion 42A of each design frame 42. Each rib 48 protrudes downward at the rear side relative to the front face of the distal end portion 42A of the design frame 42. A face (a flat surface) of each rib 48 at the inner side of the knob 16 in the left-and-right direction is disposed to be orthogonal to the left-and-right direction, and is coplanar with a distal end face 42B (a flat surface) of the design frame 42.

The ribs 48 of the pair of design frames 42 are inserted (fitted in the left-and-right direction) into the insertion hole 34 (see FIG. 5B) of the assembly plate 32 of the cover 28

(the inner member 30). As a result, the pair of ribs 48 are put into surface contact in the left-and-right direction, and the distal end faces 42B of the pair of design frames 42 are put into surface contact in the left-and-right direction. The pair of ribs 48 make contact (press) against the pressing surface 34A of the insertion hole 34 from the front side of the ribs 48, and make contact (press) against the pressing wedge 24A of the knob main body 18 (the outer member 24) from the rear side of the ribs 48 (see FIG. 5B). Therefore, front-and-rear direction positions of the pair of ribs 48 match up, and front-and-rear direction positions of the distal end portions 42A of the pair of design frames 42 match up.

Now, operation of the present exemplary embodiment is described.

In the shift lever device 10 with the structure described above, when the knob 16 is being assembled, firstly, the pair of design frames 42 are moved to the inner sides in the left-and-right direction of the knob 16 relative to the main body member 20 of the knob main body 18, and the assembly protrusions 46 of the design frames 42 are engaged with the main body member 20. Thus, the design frames 42 are assembled to the knob main body 18. Then, the cover 28 is moved to the rear side relative to the main body member 20, and the distal ends of the assembly pawls 20A of the main body member 20 are resiliently engaged with the inner member 30 of the cover 28. Thus, the cover 28 is assembled to the knob main body 18. As a result, the design frames 42 are sandwiched in the width directions thereof between the periphery portions of the first covering skin 26 of the knob main body 18 and the periphery portions of the second covering skin 38 of the cover 28.

When the cover 28 is being assembled to the knob main body 18, the ribs 48 of the pair of design frames 42 are inserted through the opening hole 36 of the assembly plate 32 of the cover 28 (the inner member 30) to the insertion hole 34 of the assembly plate 32. Thus, the pair of ribs 48 are put into surface contact in the left-and-right direction, and the distal end faces 42B of the pair of design frames 42 are put into surface contact in the left-and-right direction. Therefore, even if there is some irregularity in the design frames 42 (warping, deformation or the like from a time of molding), because the distal end faces 42B of the pair of design frames 42 are put into close proximity by the insertion hole 34, the formation of a gap between the distal end portions 42A of the pair of design frames 42 may be inhibited. As a result, a deterioration in appearance of the knob 16 at the meeting of the distal end portions 42A of the pair of design frames 42 may be suppressed, in addition to which a feeling for a vehicle occupant of being caught between the distal end portions 42A of the pair of design frames 42 when the vehicle occupant grips the knob 16 may be suppressed.

Further, when the cover 28 is being assembled to the knob main body 18, the pair of ribs 48 make contact with the left face and right face of the insertion hole 34 from sides of directions orthogonal to the direction of protrusion of the ribs 48. Therefore, the pair of ribs 48 are put into surface contact in the left-and-right direction effectively, and the distal end faces 42B of the pair of design frames 42 are put into surface contact in the left-and-right direction effectively. Thus, the formation of a gap between the distal end portions 42A of the pair of design frames 42 may be inhibited effectively.

When the cover 28 is being assembled to the knob main body 18, the pair of ribs 48 make contact with the pressing surface 34A of the insertion hole 34 from the front side of the ribs 48. Therefore, front-and-rear direction positions of the pair of ribs 48 match up, and front-and-rear direction positions of the distal end portions 42A of the pair of design frames 42 match up. Therefore, even if there is some irregularity in the design frames 42, because the outer peripheries (including the front faces) of the distal end portions 42A of the pair of design frames 42 are put into close proximity and aligned in the front-and-rear direction by the pressing surface 34A, the formation of a step between the distal end portions 42A of the pair of design frames 42 may be inhibited. As a result, a deterioration in appearance of the knob 16 at the meeting of the distal end portions 42A of the pair of design frames 42 may be even further suppressed, in addition to which a feeling for a vehicle occupant of being caught between the distal end portions 42A of the pair of design frames 42 when the vehicle occupant grips the knob 16 may be even further suppressed.

When the cover 28 is being assembled to the knob main body 18, the pair of ribs 48 make contact with the pressing wedge 24A of the knob main body 18 (the outer member 24) from the rear side of the ribs 48. Therefore, the front-and-rear direction positions of the pair of ribs 48 are even further matched up, and the front-and-rear direction positions of the distal end portions 42A of the pair of design frames 42 are even further matched up. Therefore, even if there is some irregularity in the design frames 42, because the outer peripheries (including the front faces) of the distal end portions 42A of the pair of design frames 42 are even further put into close proximity and aligned in the front-and-rear direction by the pressing surface 34A, the formation of a step between the distal end portions 42A of the pair of design frames 42 may be even further inhibited. As a result, a deterioration in appearance of the knob 16 at the meeting of the distal end portions 42A of the pair of design frames 42 may be even further suppressed, in addition to which a feeling for a vehicle occupant of being caught between the distal end portions 42A of the pair of design frames 42 when the vehicle occupant grips the knob 16 may be even further suppressed.

When the cover 28 is being assembled to the knob main body 18, the pair of ribs 48 make contact with the pressing surface 34A and the pressing wedge 24A from sides of directions orthogonal to the direction of protrusion of the ribs 48. Therefore, the front-and-rear direction positions of the pair of ribs 48 are matched up effectively, and the front-and-rear direction positions of the distal end portions 42A of the pair of design frames 42 are matched up effectively. Thus, the formation of a step between the distal end portions 42A of the pair of design frames 42 may be inhibited effectively.

In addition, the ribs 48 are provided at the distal end portions 42A of the design frames 42, and positions of the distal end portions 42A are close to positions of the ribs 48. Therefore, when the cover 28 is being assembled to the knob main body 18, because the pair of ribs 48 are put into surface contact in the left-and-right direction by the insertion hole 34, the distal end faces 42B of the pair of design frames 42 are put into surface contact in the left-and-right direction effectively, and because the front-and-rear direction positions of the pair of ribs 48 are matched up by the pressing surface 34A and the pressing wedge 24A, the front-and-rear direction positions of the distal end portions 42A of the pair of design frames 42 are matched up effectively. In consequence, the formation of a gap or step between the distal end portions 42A of the pair of design frames 42 may be suppressed effectively.

Figure 5A:
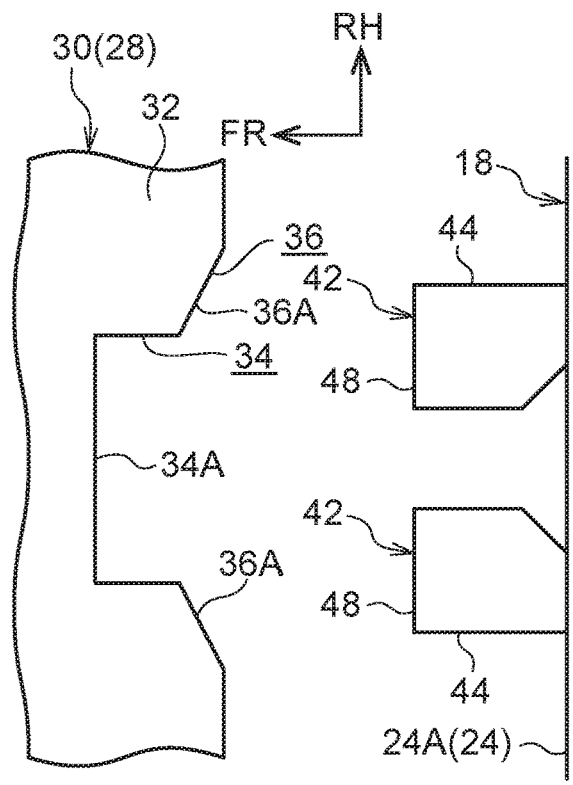
FIG. 5A is a plan view, seen from above, showing the knob of the shift lever device according to the exemplary embodiment of the present invention before the cover is assembled.
Figure 5B:
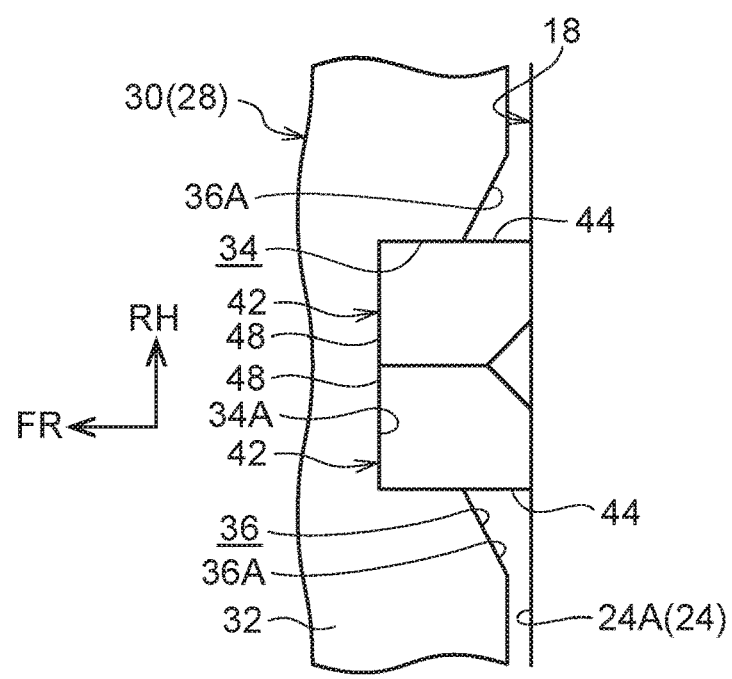
FIG. 5B is a plan view, seen from above, showing the knob of the shift lever device according to the exemplary embodiment of the present invention in a state in which the cover is assembled.

When the cover 28 is being assembled to the knob main body 18, the angled surfaces 36A of the opening hole 36 in the assembly plate 32 guide the pair of ribs 48 into the insertion hole 34 (see FIG. 5A). Therefore, the pair of ribs 48 may be inserted into the insertion hole 34 easily, and the pair of ribs 48 may be easily put into contact with the pressing surface 34A.

Because the pair of ribs 48 are inserted into the insertion hole 34, movement of the pair of design frames 42 in the left-and-right direction is inhibited, and because the pair of ribs 48 are in contact with the pressing surface 34A and the pressing wedge 24A, movement of the pair of design frames 42 in the front-and-rear direction is inhibited. Therefore, sliding of the metal plating 44 of the design frames 42 against the first covering skin 26 of the knob main body 18 and the second covering skin 38 of the cover 28 may be inhibited, and the production of noise by this sliding may be suppressed.

In the present exemplary embodiment, the pair of ribs 48 are put into contact with the pressing surface 34A and the pressing wedge 24A. However, one or both of the pair of ribs 48 need not be put into contact with one or both of the pressing surface 34A and the pressing wedge 24A if, for example, there are no irregularities in the design frames 42.

In the present exemplary embodiment, the pair of design frames 42 are formed as separate bodies. However, for example, the proximal ends of the pair of design frames 42 may be connected and the pair of design frames 42 made integral.

The disclosures of Japanese Patent Application No. 2016-219712 filed Nov. 10, 2016 are incorporated into the present specification by reference in their entirety.

EXPLANATION OF THE REFERENCE SYMBOLS

10 Shift lever device (shift device)
12 Shift lever (shift body)
18 Knob main body (pressing body)
28 Cover (assembly body)
34 Insertion hole (assembly portion)
34A Pressing surface (assembly portion)
36A Angled surface (guide portion)
42 Design frame (adjacent body)
42A Distal end portion (adjacent portion)
48 Rib (operation portion)

The invention claimed is:

1. A shift device comprising:
a pair of adjacent bodies provided at a shift body that is moved to change a shift position;
an adjacent portion and an operation portion being provided at each adjacent body, and the adjacent portions being adjacent to one another; and
an assembly body provided at the shift body, the assembly body being provided with an assembly portion into which the operation portions are inserted, by which the adjacent portions are put into contact.

2. The shift device according to claim 1, further comprising a pressing body that is provided at the shift body, that is assembled to the assembly body, that is capable of pressing at least one of the operation portions from a shift body inner side thereof, and that is capable of making outer peripheries of the adjacent portions approach one another.

3. The shift device according to claim 1, further comprising a guide portion that is provided at the assembly body and that guides at least one of the operation portions to the assembly portion.

4. The shift device according to claim 1, wherein at least one of the adjacent portions and at least one of the operation portions are provided at a length direction end portion of at least one of the adjacent bodies.

5. The shift device according to claim 1, wherein at least one of the adjacent bodies is engaged with the shift body at a portion other than at least one of the adjacent portions and at least one of the operation portions.

6. The shift device according to claim 1, wherein the pair of adjacent bodies are integrated at portions other than the adjacent portions and the operation portions.

7. A shift device comprising:
a pair of adjacent bodies provided at a shift body that is moved to change a shift position;
an adjacent portion and an operation portion being provided at each adjacent body, and the adjacent portions being adjacent to one another; and
an assembly body provided at the shift body, an assembly portion being provided at the assembly body, the assembly portion being capable of pressing at least one of the operation portions from a shift body outer side thereof, and the assembly portion being capable of making outer peripheries of the adjacent portions approach one another.

8. The shift device according to claim 7, wherein the assembly portion is capable of pressing at least one of the operation portions from a side of the operation portion being pressed in a direction orthogonal to a direction of protrusion of the operation portion being pressed.

9. The shift device according to claim 7, further comprising a pressing body that is provided at the shift body, that is assembled to the assembly body, that is capable of pressing at least one of the operation portions from a shift body inner side thereof, and that is capable of making outer peripheries of the adjacent portions approach one another.

10. The shift device according to claim 7, further comprising a guide portion that is provided at the assembly body and that guides at least one of the operation portions to the assembly portion.

11. The shift device according to claim 7, wherein at least one of the adjacent portions and at least one of the operation portions are provided at a length direction end portion of at least one of the adjacent bodies.

12. The shift device according to claim 7, wherein at least one adjacent body is engaged with the shift body at a portion other than at least one of the adjacent portions and at least one of the operation portions.

13. The shift device according to claim 7, wherein the pair of adjacent bodies are integrated at portions other than the adjacent portions and the operation portions.

* * * * *